UNITED STATES PATENT OFFICE.

WILLIAM MORRIS DAVIS, OF PHILADELPHIA, PENNSYLVANIA.

DEPOSITING GOLD FROM ITS SOLUTIONS.

SPECIFICATION forming part of Letters Patent No. 227,963, dated May 25, 1880.

Application filed February 11, 1880.

*To all whom it may concern:*

Be it known that I, WILLIAM MORRIS DAVIS, of the city of Philadelphia, State of Pennsylvania, have invented a new and useful Process of Depositing Gold from its Aqueous Solutions, of which the following is a full, true, and exact description.

My process consists in exposing an aqueous solution of gold to the action of carbon. This carbon may be that known as "animal," "vegetable," or "mineral" carbon, existing in the forms of lamp-black, bone-black, charcoal, coke, or mineral shales; but the success of the process in all cases depends upon the action of the carbon upon the aqueous solution of gold.

To effect the deposition I bring the aqueous solution of gold in contact with carbon, either pulverized, granulated, or in masses, and the action which follows causes a precipitation of the gold in fine powder, or upon the surface of the carbon in metallic leaf or plates, while copper and other soluble impurities in the solution are carried off by the escaping liquid. The chemical reaction causing this precipitation is not, perhaps, entirely understood; but reasoning by analogy from the action of chlorine on selenious acid in converting it into selenic acid, and on ether in converting it into chlorine ether, this remarkable result may be explained by the following formula:

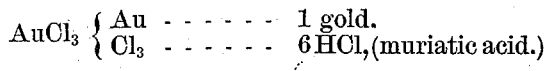

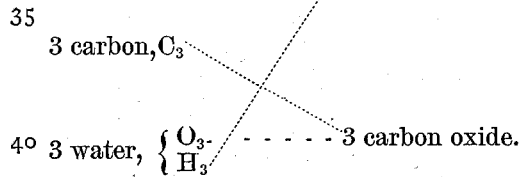

Thus three equivalents of carbon precipitate one equivalent of gold, or, by combining weights, eighteen of carbon precipitate one hundred and ninety-one of gold.

In putting my process into practice I prefer to use wood-charcoal of a size between that which will pass through a No. 20 and a No. 40 screen; but carbon in other forms may be used, such as granulated or powdered carbon, or by immersing larger masses of charcoal in the solution. I prefer to use granulated carbon confined in any suitable vessel, through which the solution is allowed to pass in a flow preferably regulated.

I have found that the best commercial results are obtained by allowing the solution to remain in contact with the carbon for about one hour. When the last trace of gold has disappeared from the solution the process is completed.

No special apparatus is required in carrying out my process; but a convenient arrangement consists in three vessels containing carbon arranged in series, the solution passing first through No. 1, then through No. 2, and then through No. 3. When No. 1 becomes charged with gold it is washed with water, and then removed from the series, that the auriferous carbon may be utilized. No. 2, partially charged, is advanced to the place of No. 1, and becomes the first in the series, while the lower tanks are advanced by one step, and a tank containing fresh carbon is placed at the end of the series as a guard against any possible loss, although I find that the first vessel practically removes all the gold.

I find in practice that each vessel may contain about twenty-eight inches in thickness of carbon; but these arrangements and this amount of carbon may be varied to suit the requirements of the different circumstances.

Having thus deposited the gold on or in the carbon, it is removed as above described, and by means of an appropriate furnace reduced to an ash, in which the gold will be found. I treat this auriferous ash with chlorhydric acid, wash away the soluble salts, and reduce the gold to ingot by crucible reduction; but these latter steps of the process may be varied to suit the convenience of the operator. Having deposited the gold upon the carbon, it may be separated therefrom in any well-known way.

I am aware that it has been stated that recently-ignited charcoal will separate the gold contained in its aqueous solution in sunshine, or at a temperature of 109°, and that it will only separate the gold under those conditions, and that under those conditions the charcoal becomes spotted with gold; but it was not there taught that this result could be obtained excepting under the peculiar conditions there set out, nor that the gold so deposited could be afterward separated, or that it was deposited in sufficient quantity to be of any commercial value in the art, and so far as I am aware no use has ever been made of this information in the commercial separation of gold from its solution.

What I claim as my invention, and desire to secure by Letters Patent, is—

1. The process of commercially depositing gold from its solution by subjecting the same to the action of carbon, substantially as herein set forth.

2. The process of depositing gold from its solution by causing a current of such solution to flow past or through carbon, substantially as described.

3. The process of obtaining gold from its solution by bringing said solution in contact with carbon, and thereby depositing the gold upon it, and of subsequently obtaining the gold from the carbon by calcination or other equivalent means, substantially as described.

WM. MORRIS DAVIS.

Witnesses:
S. F. SULLIVAN,
GEO. W. MIATT.